United States Patent
Koyama et al.

(10) Patent No.: US 12,381,297 B2
(45) Date of Patent: Aug. 5, 2025

(54) CYLINDRICAL NON-AQUEOUS ELECTROLYTE SECONDARY CELL

(71) Applicants: SANYO Electric Co., Ltd., Daito (JP); Panasonic Corporation, Kadoma (JP)

(72) Inventors: Shota Koyama, Osaka (JP); Tomohiko Yokoyama, Osaka (JP); Ryo Kashimura, Osaka (JP); Satoru Mihara, Osaka (JP); Ryota Okimoto, Osaka (JP)

(73) Assignees: PANASONIC ENERGY CO., LTD., Osaka (JP); PANASONIC HOLDINGS CORPORATION, Osaka (JP)

( * ) Notice: Subject to any disclaimer, the term of this patent is extended or adjusted under 35 U.S.C. 154(b) by 692 days.

(21) Appl. No.: 17/621,466

(22) PCT Filed: Jun. 24, 2020

(86) PCT No.: PCT/JP2020/024745
§ 371 (c)(1),
(2) Date: Dec. 21, 2021

(87) PCT Pub. No.: WO2020/262437
PCT Pub. Date: Dec. 30, 2020

(65) Prior Publication Data
US 2022/0416380 A1    Dec. 29, 2022

(30) Foreign Application Priority Data
Jun. 28, 2019  (JP) .................. 2019-120967

(51) Int. Cl.
*H01M 50/593* (2021.01)
*H01M 10/0587* (2010.01)
(Continued)

(52) U.S. Cl.
CPC ..... *H01M 50/593* (2021.01); *H01M 10/0587* (2013.01); *H01M 50/188* (2021.01); *H01M 50/30* (2021.01); *H01M 50/586* (2021.01)

(58) Field of Classification Search
None
See application file for complete search history.

(56) References Cited

U.S. PATENT DOCUMENTS

| | | |
|---|---|---|
| 2006/0154137 A1 | 7/2006 | Abe et al. |
| 2015/0010793 A1 | 1/2015 | Yokoyama et al. |

(Continued)

FOREIGN PATENT DOCUMENTS

| | | |
|---|---|---|
| JP | 2006-196292 A | 7/2006 |
| JP | 2008-103131 A | 5/2008 |

(Continued)

OTHER PUBLICATIONS

International Search Report dated Sep. 1, 2020, issued in counterpart International Application No. PCT/JP2020/024745 (2 pages).

(Continued)

*Primary Examiner* — Jonathan Crepeau
(74) *Attorney, Agent, or Firm* — WHDA, LLP

(57) ABSTRACT

The secondary cell—includes an exterior can, a sealing body closing one end of the exterior can, an electrode group disposed inside the exterior can, and an insulating plate disposed between the sealing body and the electrode group. In the electrode group, a positive electrode and a negative electrode are wound in a spiral shape with a separator interposed between. The insulating plate is shaped as a disc having a lead hole penetrated by a positive electrode lead drawn out from the electrode group, and a center hole penetrating the center part of the insulating plate. The outer edge of the lead hole includes a curve part positioned along an arc that is concentric with respect to the outer circumference of the insulating plate as seen in plan view, and linear parts-positioned along a chord linking the two ends of the arc.

8 Claims, 8 Drawing Sheets

(51) Int. Cl.
    *H01M 50/188*     (2021.01)
    *H01M 50/30*     (2021.01)
    *H01M 50/586*     (2021.01)

(56) References Cited

U.S. PATENT DOCUMENTS

| | | |
|---|---|---|
| 2017/0346064 A1 | 11/2017 | Fukuoka et al. |
| 2020/0020897 A1 | 1/2020 | Enomoto et al. |
| 2020/0119406 A1 | 4/2020 | Sugaya et al. |
| 2020/0280027 A1 | 9/2020 | Yamagami et al. |

FOREIGN PATENT DOCUMENTS

| | | |
|---|---|---|
| WO | 2013/099295 A1 | 7/2013 |
| WO | 2016/098291 A1 | 6/2016 |
| WO | 2016/116876 A1 | 7/2016 |
| WO | 2018/116876 A1 | 6/2018 |
| WO | 2018/179721 A1 | 10/2018 |
| WO | 2019/054312 A1 | 3/2019 |

OTHER PUBLICATIONS

The Extended European Search Report dated Jul. 19, 2022, issued in counterpart to EP Application No. 20832370.9. (8 pages).
Office Action dated Jul. 2, 2024, issued in counterpart JP Application No. 2021-527674, with English translation. (7 pages).

(COMPARATIVE EXAMPLE)

Figure 7
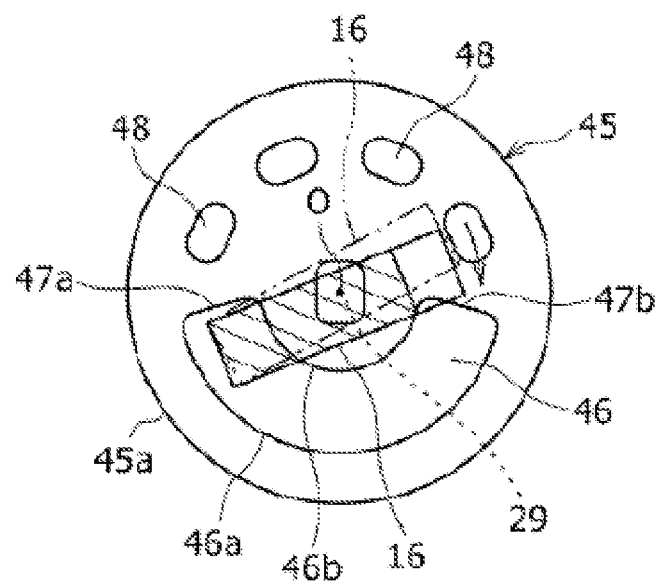
(COMPARATIVE EXAMPLE)
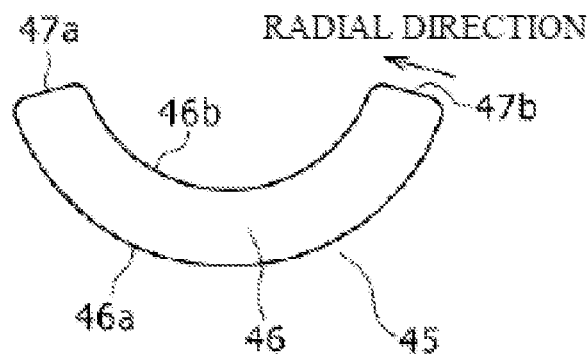
Figure 8(a)
(COMPARATIVE EXAMPLE)
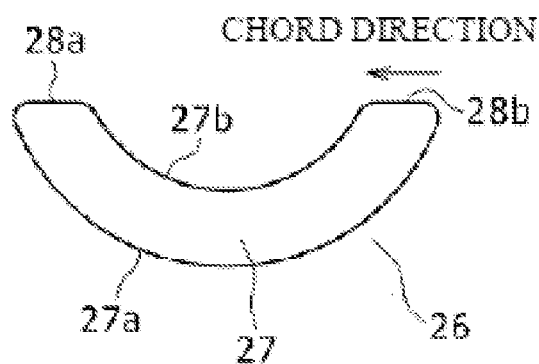
Figure 8(b)
(EMBODIMENT)

| | EXPERIMENT EXAMPLE 1 | EXPERIMENT EXAMPLE 2 | EXPERIMENT EXAMPLE 3 | EXPERIMENT EXAMPLE 4 |
|---|---|---|---|---|
| SHAPE | | | | |
| OPENING RATE (WITH RESPECT TO UPPER INSULATING PLATE) | 18.3 | 15.4 | 11.7 | 5.6 |
| RUPTURE RATE OF BATTERY CASES (HIGH-TEMPERATURE OVERHEATING TEST) | 0/10 | 0/10 | 0/10 | 3/10 |

CYLINDRICAL NON-AQUEOUS ELECTROLYTE SECONDARY CELL

CROSS-REFERENCE TO RELATED APPLICATIONS

This application is a National Stage of International Application No. PCT/JP2020/024745, filed Jun. 24, 2020, and claims the benefit of Japanese Patent Application No. 2019-12096, filed in the Japan Patent Office on Jun. 28, 2019, each of which is incorporated by reference herein in its entirety.

TECHNICAL FIELD

The present disclosure relates to a cylindrical non-aqueous electrolyte secondary battery.

BACKGROUND ART

Conventionally, in cylindrical secondary batteries in which a positive electrode lead-embedded positive electrode plate is used, an upper insulating plate having a central hole is disposed on an electrode group in order to prevent short-circuiting caused by the contact between the positive electrode lead and the electrode group. The central hole penetrates a central portion of the upper insulating plate and is used to exhausts high-pressure gas generated inside the secondary battery through the upper insulating plate or to pour an electrolytic solution into the electrode group. The electrode group is disposed inside an exterior can, and one end of the exterior can is sealed with a sealing assembly.

Patent Literature 1 discloses a cylindrical secondary battery having an upper insulating plate, in which the cylindrical secondary battery is configured to have a central hole, a lead hole through which a positive electrode lead penetrates and a plurality of open portions formed in a half portion on the opposite side to the lead hole. The lead hole has an arc shape of substantially a semicircle in a plan view and has two straight lines that extend substantially in a radial direction at both ends in the circumferential direction.

CITATION LIST

Patent Literature

PATENT LITERATURE 1: International Publication No. WO. 2019/054312

SUMMARY

Technical Problem

In the configuration described in Patent Literature 1, there are cases where the positive electrode lead is drawn out from one end portion in an arc direction of the lead hole in the upper insulating plate toward the sealing assembly. In this case, when a portion of the positive electrode lead drawn out from the upper insulating plate toward the sealing assembly is folded toward the upper insulating plate, a conductive portion of the positive electrode lead is likely to face the electrode group through the other end of the lead hole in the arc direction. Therefore, secondary batteries having a concern of short-circuiting in the future depending on a folding position of the positive electrode lead with respect to the central portion of the upper insulating plate at the time of producing secondary batteries are produced as production failures, which increases the production costs of batteries. Particularly, as the size of the lead hole in the arc direction increases, there is a greater need to strictly manage the folding position of the positive electrode lead. However, the size of the lead hole in the arc direction affects the insertability of the positive electrode lead into the lead hole, and thus a shape that does not excessively limit the size is desired.

It is an advantage of the present disclosure to provide a cylindrical non-aqueous electrolyte secondary battery capable of effectively preventing short circuiting between an electrode group and a positive electrode lead that arises from a variation of a folding position of the positive electrode lead with respect to an insulating plate.

Solution to Problem

A cylindrical non-aqueous electrolyte secondary battery according to the present disclosure is a cylindrical non-aqueous electrolyte secondary battery comprising an external can, a sealing assembly that seals one end of the exterior can, an electrode group disposed inside the exterior can and an insulating plate disposed between the sealing assembly and the electrode group, in which the electrode group includes a positive electrode and a negative electrode wound in a spiral shape with a separator interposed therebetween, the insulating plate has a disc shape having a lead hole through which a positive electrode lead that is drawn out from the electrode group penetrates and a central hole that penetrates a central portion, and an outer edge portion of the lead hole includes, in a plan view, a curve portion disposed along an arc concentric with an outer circumferential circle of the insulating plate and a straight portion disposed along a chord that connects both ends of the arc.

Advantageous Effect of Invention

According to the cylindrical non-aqueous electrolyte secondary battery according to the present disclosure, it is possible to effectively prevent short-circuiting between the electrode group and the positive electrode lead that arises from a variation of a folding position of the positive electrode lead with respect to the insulating plate.

BRIEF DESCRIPTION OF DRAWINGS

FIG. 7 is a view corresponding to FIG. 6 in a case where the positive electrode lead is drawn out from one end portion of the lead hole in the circumferential direction in the cylindrical non-aqueous electrolyte secondary battery of the comparative example.

FIG. 8(a) and FIG. 8(b) are views showing different portions between a shape of the lead hole in the upper insulating plate of the embodiment and a shape of the lead hole of the comparative example.

DESCRIPTION OF EMBODIMENT

Hereinafter, an embodiment of the present invention will be described in detail with reference to the accompanying drawings. In the following description, specific shapes, materials, numerical values, numbers, directions and the like are examples for easy understanding of the present invention and can be appropriately modified in accordance with the specifications of non-aqueous electrolyte secondary batteries. Additionally, in the following description, the expression "substantially" is used to mean that, for example, not only completely the same cases but also substantially the same cases are included.

One Example of Embodiment

Figure 1:
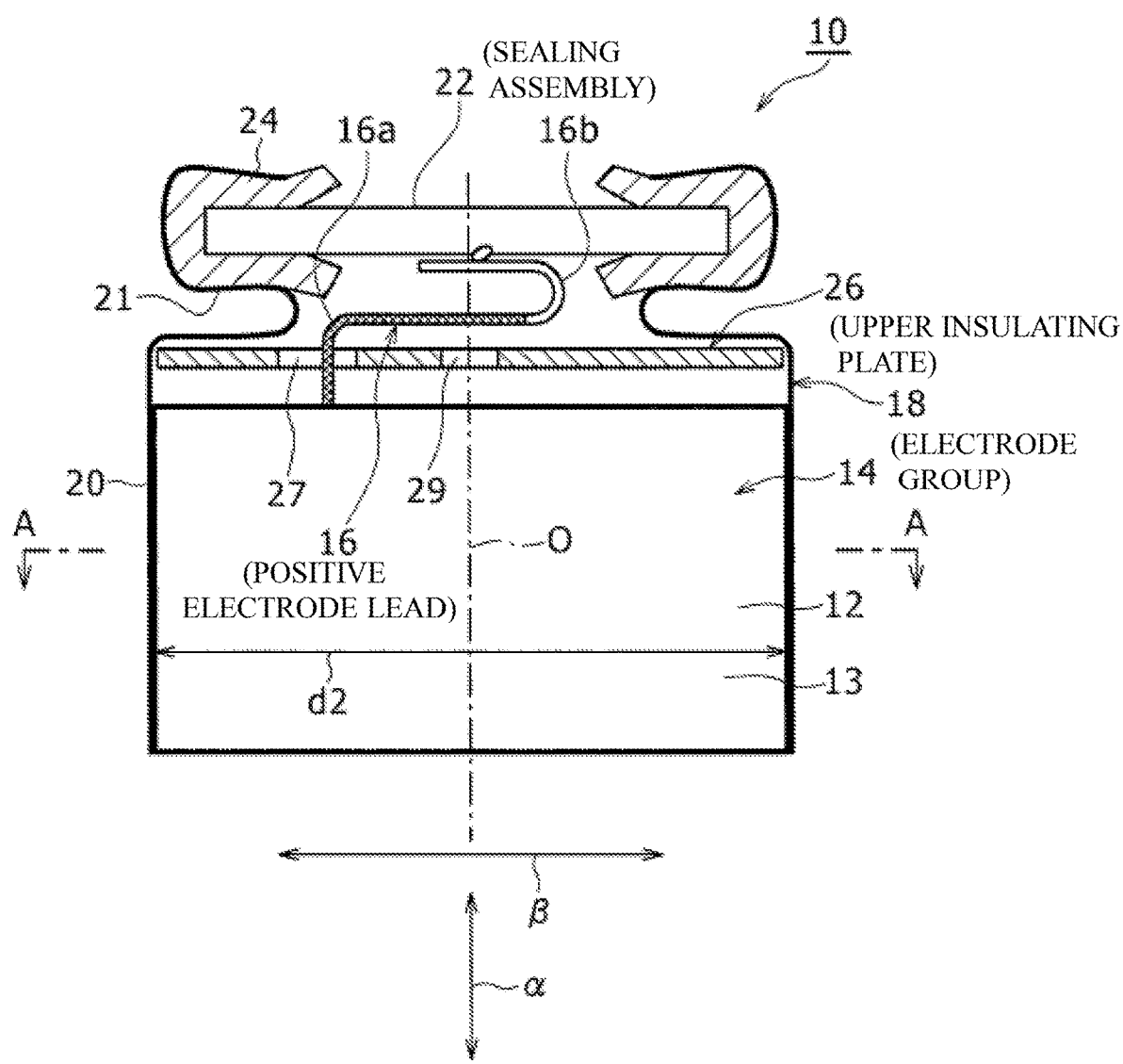
FIG. 1 is a schematic sectional view of a cylindrical non-aqueous electrolyte secondary battery of an example of an embodiment.
Figure 2:
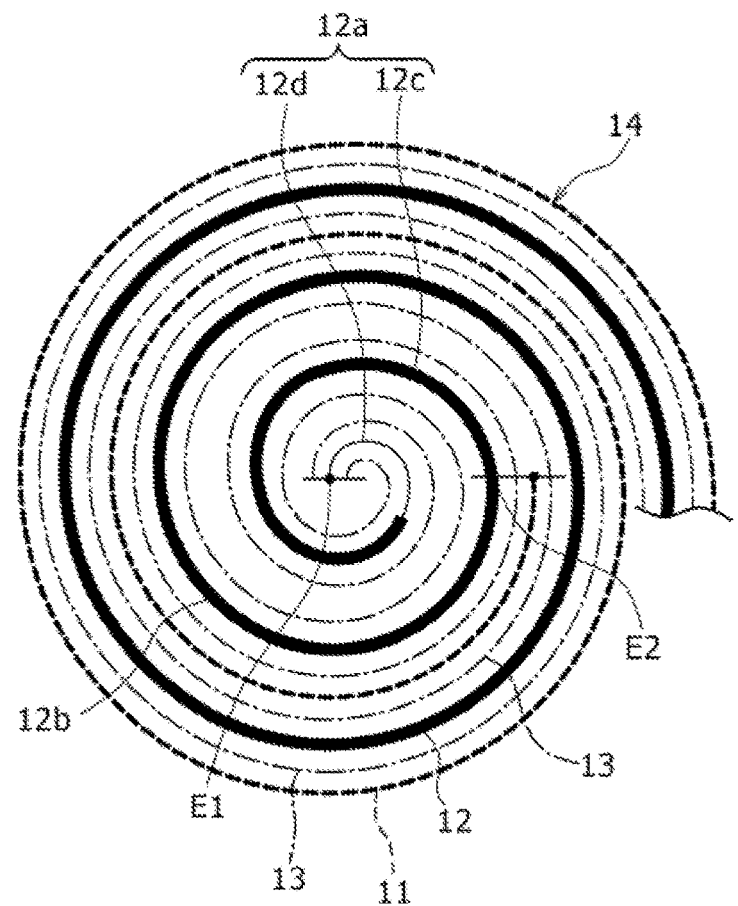
FIG. 2 is a view schematically showing a portion close to a winding-direction inner end in an electrode group in a cross section A-A in FIG. 1.

FIG. 1 is a schematic sectional view of a cylindrical non-aqueous electrolyte secondary battery 10 of an embodiment. FIG. 2 is a view schematically showing a portion close to a winding-direction inner end in an electrode group 14 in a cross section A-A in FIG. 1. As shown in FIG. 1 and FIG. 2, the cylindrical non-aqueous electrolyte secondary battery 10 comprises the wound electrode group 14 and a non-aqueous electrolyte (not shown). As shown in FIG. 2, the electrode group 14 has a positive electrode 11, a negative electrode 12 and a separator 13, and the positive electrode 11 and the negative electrode 12 are wound in a spiral shape with the separator 13 interposed therebetween. In FIG. 2, in order for easy understanding of the disposition relationships, the negative electrode 12 is indicated by solid lines, the positive electrode 11 is indicated by a broken line, and the separator 13 is indicated by a dash-dotted line. In FIG. 2, gaps between the positive electrode 11, the negative electrode 12 and the separator 13 are exaggeratedly shown. FIG. 1 shows a shape of the electrode group 14 viewed from the outer circumferential side. Hereinafter, one side of the electrode group 14 in a winding axis direction will be referred to as an "upper side" and the other side in the winding axis direction will be referred to as a "lower side" in some cases. The non-aqueous electrolyte contains a non-aqueous solvent and an electrolyte salt dissolved in the non-aqueous solvent. The non-aqueous electrolyte is not limited to a liquid electrolyte and may be a solid electrolyte for which a gel-form polymer or the like is used. Hereinafter, the cylindrical non-aqueous electrolyte secondary battery 10 will be referred to as a secondary battery 10.

The positive electrode 11, the negative electrode 12 and the separator 13 that configure the electrode group 14 are all formed in a band shape and wound in a spiral shape, thereby forming a state in which the positive electrode 11, the negative electrode 12 and the separator 13 are alternately laminated in the radius direction of the electrode group 14. In the electrode group 14, a longitudinal direction of each electrode becomes a winding direction, and a width direction of each electrode becomes the winding axis direction. As shown in FIG. 1, a positive electrode lead 16 that electrically connects the positive electrode 11 and a positive electrode terminal is provided at, for example, substantially the center between a winding inner end portion and a winding outer end portion of the electrode group 14 and is drawn out from an upper end (the upper side in FIG. 1) of the electrode group 14 in a winding axis direction α. A negative electrode lead 40 (FIG. 3) that electrically connects the negative electrode 12 and a negative electrode terminal is provided at, for example, an end portion where the electrode group 14 begins to be wound, and the lower end of the negative electrode lead 40 is joined to a bottom portion of a bottomed cylindrical exterior can 20. In FIG. 1, the negative electrode 12 is exposed on an outermost circumferential surface of the electrode group 14, and the outermost circumferential surface of the negative electrode 12 is brought into contact with an inner circumferential surface of the exterior can 20. This connects both end portions of the negative electrode 12 to the exterior can 20 that functions as the negative electrode terminal of the secondary battery 10.

The positive electrode lead 16 and the negative electrode lead 40 are each a rectangular band-shaped conductive member that is thicker than an electrode core body of the electrode. A thickness of each lead is, for example, three times to 30 times a thickness of the electrode core body and is usually 50 μm to 500 μm. A material that configures each lead is not particularly limited. Preferably, the positive electrode lead 16 is made of a metal containing aluminum as a main component and the negative electrode lead is made of a metal containing nickel or copper as a main component or a metal containing both nickel and copper, respectively. It should be noted that the negative electrode 12 may not be exposed on the outermost circumferential surface of the electrode group 14, another negative electrode lead may be joined to an end portion where the winding of the negative electrode core body ends, and the negative electrode lead may be drawn out from a lower end (the lower side in FIG. 1) of the electrode group 14 in the winding axis direction α and joined to the bottom portion of the exterior can 20 together with the negative electrode lead 40.

The positive electrode 11 and the negative electrode 12 will be described in more detail. The positive electrode 11 has a band-shaped positive electrode core body and positive electrode mixture layers formed on the electrode core body. For example, the positive electrode mixture layers are formed on both surfaces of the positive electrode core body. As the positive electrode core body, for example, a metal (aluminum or the like) foil, a film having the metal disposed on a surface layer, or the like is used. A preferable positive electrode core body is a metal foil containing aluminum or an aluminum alloy as a main component. The thickness of the positive electrode core body is, for example, 10 μm to 30 μm.

On both surfaces of the positive electrode core body, the positive electrode mixture layers are preferably formed on the entire region excluding a plain portion to which the positive electrode lead is to be joined. The positive electrode mixture layer preferably contains a positive electrode active material, a conductive agent and a binding agent. The positive electrode is produced by applying a positive electrode mixture slurry containing the positive electrode active material, the conductive agent, the binding agent and a solvent such as N-methyl-2-pyrrolidone (NMP) to both surfaces of the positive electrode core body and then drying and rolling the positive electrode mixture slurry.

As the positive electrode active material, a lithium-containing transition metal oxide containing a transition metal element such as Co, Mn or Ni can be exemplified. The lithium-containing transition metal oxide is not particularly limited, but is preferably a composite oxide represented by General Formula $Li_{1+x}MO_2$ (in the formula, $-0.2<x\leq0.2$, and M includes at least one of the group consisting of Ni, Co, Mn and Al).

Examples of the conductive agent include carbon materials such as carbon black (CB), acetylene black (AB), ketjen black and graphite and the like. Examples of the binding agent include fluororesins such as polytetrafluoroethylene (PTFE) and polyvinylidene fluoride (PVdF), polyacrylonitrile (PAN), polyimide (PI), acrylic resin, polyolefin-based resin, and the like. In addition, these resins may be jointly used with carboxymethyl cellulose (CMC) or a salt thereof, polyethylene oxide (PEO) or the like. These resins may be used singly or two or more thereof may be used in combination.

The negative electrode 12 has a band-shaped negative electrode core body and negative electrode mixture layers formed on the negative electrode core body. For example, the negative electrode mixture layers are formed on both surfaces of the negative electrode core body. As the negative electrode core body, for example, a metal (copper or the like) foil, a film having the metal disposed on a surface layer, or the like is used. A thickness of the negative electrode core body is, for example, 5 μm to 30 μm.

On both surfaces of the negative electrode core body, the negative electrode mixture layers can be formed on almost the entire region excluding a plain portion to which the negative electrode lead 40 is to be joined. The negative electrode mixture layer preferably contains a negative electrode active material and a binding agent. The negative electrode 12 is produced by applying a negative electrode mixture slurry containing the negative electrode active material, the binding agent and water or the like to both surfaces of the negative electrode core body and then drying and rolling the negative electrode mixture slurry.

The negative electrode active material is not particularly limited as long as lithium ions can be reversibly absorbed and released, and it is possible to use, for example, a carbon material such as natural graphite or artificial graphite, a metal that forms an alloy with lithium such as Si or Sn, an alloy containing the metal, a composite oxide, and the like. As the binding agent that is contained in the negative electrode mixture layer, for example, the same resin as in the case of the positive electrode 11 can be used. In a case of preparing the negative electrode mixture slurry with an aqueous solvent, it is possible to use styrene-butadiene rubber (SBR), CMC or a salt thereof, polyacrylic acid or a salt thereof, polyvinyl alcohol, or the like. These may be used singly or two or more thereof may be used in combination.

Figure 3:
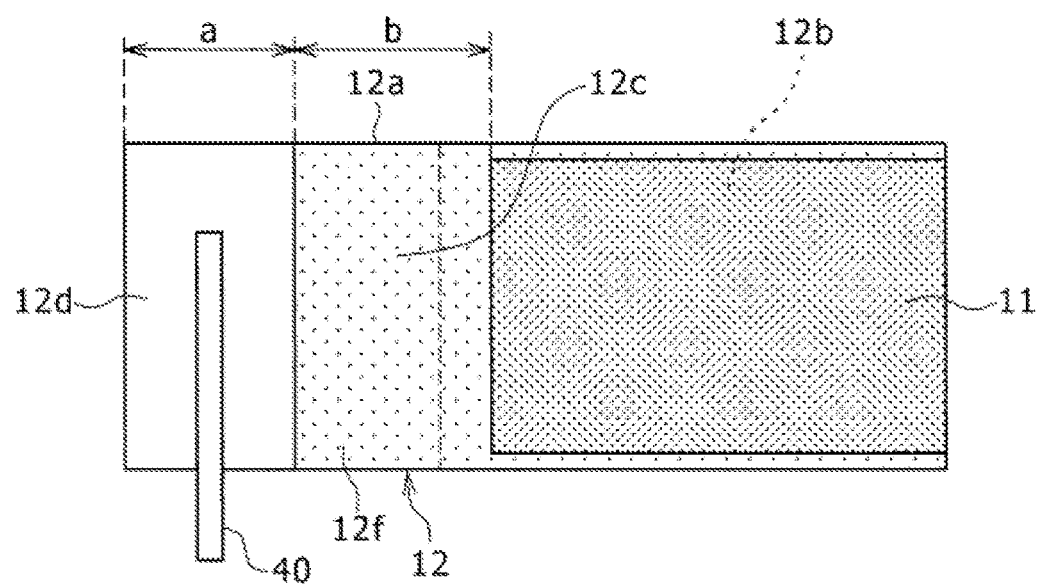
FIG. 3 is a view showing a facing relationship between a positive electrode and a negative electrode by developing the portion close to the winding-direction inner end of the electrode group shown in FIG. 2.
Figure 4:
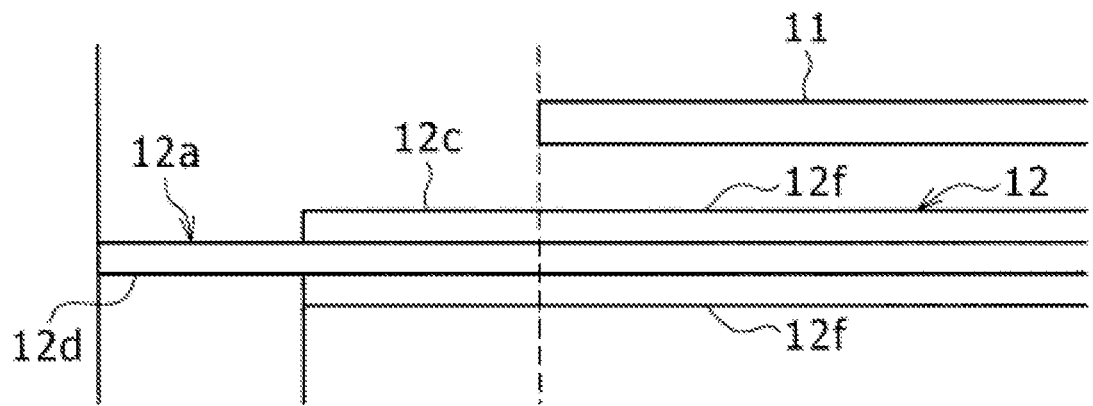
FIG. 4 is a schematic view of FIG. 3 viewed from above.

FIG. 3 is a view showing a facing relationship between the positive electrode 11 and the negative electrode 12 by developing a portion close to a winding-direction inner end of the electrode group 14 shown in FIG. 2. FIG. 4 is a schematic view of FIG. 3 viewed from above. As shown in FIG. 2 to FIG. 4, of the positive electrode 11 and the negative electrode 12, only the negative electrode 12 is disposed in the portion where the electrode group 14 begins to be wound. Specifically, the negative electrode 12 includes a non-facing portion 12a wound 1.25 windings or more from the winding-direction inner end (point E1 in FIG. 2), which is an end where the electrode group 14 begins to be wound, in a state of not facing the positive electrode 11 through the separator 13. In FIG. 2, the negative electrode 12 includes the non-facing portion 12a wound 1.5 windings from the winding-direction inner end E1 and a facing portion 12b that is continuously wound from the non-facing portion 12a and faces the positive electrode 11 through the separator 13. The non-facing portion 12a is a portion from the winding-direction inner end E1 to a point E2 along the winding direction in the negative electrode 12 shown in FIG. 2.

In FIG. 2, a straight line that passes through E2 is drawn such that a distance from the winding-direction inner end of the positive electrode 11 to the negative electrode 12 on the inside of the winding becomes shortest, and an intersection E2 between this straight line and the negative electrode 12 corresponds to a winding-direction outer end of the non-facing portion 12a. In addition, a straight line that passes through E1 is drawn so as to be disposed on an extension line of the straight line that passes through E2.

Incidentally, the non-facing portion 12a has a negative electrode mixture layer-formed portion 12c and a negative electrode core body-exposed portion 12d. The negative electrode mixture layer-formed portion 12c is a portion where the negative electrode mixture layer is formed on at least one surface continuously from the winding-direction outer end (point E2 in FIG. 2) of the non-facing portion 12a toward the winding-direction inside. The negative electrode core body-exposed portion 12d is a portion where the negative electrode mixture layers are not formed on both surfaces continuously from the winding-direction inner end (point E1 in FIG. 2) of the non-facing portion 12a toward the winding-direction outside. In FIG. 2, the negative electrode core body-exposed portion 12d is indicated by a fine solid line, and the negative electrode mixture layer-formed portion 12c is indicated by a thick solid line. In addition, the negative electrode mixture layer-formed portion 12c is wound 0.75 windings or more. The example of FIG. 2 shows a case where the negative electrode mixture layer-formed portion 12c is wound 0.8 windings. This makes it possible to realize, at low costs, a structure capable of securing an exhaust path for a winding core of the electrode group 14 in a case of ignition of the secondary battery 10 as described below.

Furthermore, in the secondary battery 10, a battery case 18 that accommodates the electrode group 14 and the non-aqueous electrolyte is composed of the exterior can 20, which is a bottomed cylindrical metal container, and a sealing assembly 22. The sealing assembly 22 seals an open end portion of the exterior can 20. A gasket 24 is provided between the exterior can 20 and the sealing assembly 22 to secure sealability in the battery case 18. The exterior can 20 has a projecting portion 21 that has been formed by, for example, pressing a side surface portion from the outside and supports the sealing assembly 22. The projecting portion 21 is preferably formed in an annular shape along the circumferential direction of the exterior can 20 and supports the sealing assembly 22 by the upper surface thereof.

In FIG. 1, the sealing assembly 22 is schematically shown in a disc shape having a rectangular cross section. Incidentally, in actual cases, the sealing assembly 22 is configured to have an internal pressure-actuated safety valve. For example, the sealing assembly 22 is composed of a filter, a lower vent member, an insulating member, an upper vent member and a cap laminated in order from the electrode group 14 side. The individual members that configure the sealing assembly 22 each have, for example, a disc shape or a ring shape, and the individual members, excluding the insulating member, are electrically connected to one another. The lower vent member and the upper vent member are connected to each other at central portions of the respective vent members, and the insulating member is interposed between circumferential edge portions of the respective vent members. When the internal pressure of the battery increases and reaches to a predetermined first pressure due to abnormal heat generation, for example, the lower vent member breaks, and the upper vent member is swollen toward the cap and separated from the lower vent member, whereby electrical connection between both vent members is cut off. Furthermore, when the internal pressure reaches a predetermined second pressure, the upper vent member breaks, and a gas generated inside is released through an open portion formed in the cap. The upper vent member and the lower vent member form an exhaust valve.

An upper insulating plate 26 is disposed between the sealing assembly 22 and the electrode group 14. In FIG. 1, the upper insulating plate 26 is shown to be separated from the electrode group 14; however, in actual cases, the upper insulating plate 26 is disposed so as to be in contact with the upper end of the electrode group 14. The positive electrode lead 16 is a conductive member for electrically connecting the positive electrode core body and the positive electrode terminal and is drawn out from the upper end of the electrode group 14 toward one side (upward in FIG. 1) in the winding axis direction α of the electrode group 14. One end of the positive electrode lead 16 is joined to, for example, a portion in the positive electrode core body that is positioned in substantially a central portion of the electrode group 14 in a radial direction β. In addition, the other end (upper end in FIG. 1) of the positive electrode lead 16 is joined to near the center of the lower surface of the sealing assembly 22. In this state, the positive electrode lead 16 extends toward the sealing assembly 22 through a lead hole 27, which will be described below, in the upper insulating plate 26. In the secondary battery 10, a top plate of the sealing assembly 22 or the cap that is positioned at the upper end serves as the positive electrode terminal.

In a case of forming the secondary battery 10, the positive electrode lead 16 drawn out from the electrode group 14 is disposed to overlap the sealing assembly 22. In addition, the positive electrode lead 16 is welded to the sealing assembly 22 by laser welding or the like. Insulating tape is attached to a portion on the electrode group 14 side in the portion of the positive electrode lead 16 drawn out from the electrode group 14. In FIG. 1, the portion to which the insulating tape is attached is indicated by a diagonal lattice portion in the positive electrode lead 16. Therefore, in the drawn portion of the positive electrode lead 16, a plain portion in FIG. 1 becomes an exposed portion of a conductive portion not covered with the insulating tape.

After the positive electrode lead 16 is connected to the sealing assembly 22 as described above, the sealing assembly 22 is mounted in the open end portion of the exterior can 20. At that time, the positive electrode lead 16 is folded toward the upper insulating plate 26 at a position adjacent to the lead hole 27, whereby a first curve portion 16a is formed. Furthermore, the positive electrode lead 16 is turned back at a position opposite to the first curve portion 16a with respect to a central axis O of the secondary battery 10 that intersects the sealing assembly 22, whereby a second curve portion 16b is formed. The insulating tape is preferably attached to the positive electrode lead 16 from the electrode group 14 side toward the sealing assembly 22 side up to an inflection point of the second curve portion 16b so as not to impair welding of the sealing assembly 22 and the positive electrode lead 16. It should be noted that the insulating tape may be attached not only to the portion of the positive electrode lead 16 that is drawn out from the electrode group 14 but also to a part of a portion that is disposed inside the electrode group 14 or may be attached only to the surface that faces the upper insulating plate 26. In addition, the insulating tape may be attached so as to be wound in a screw shape in the diagonal lattice portion of FIG. 1 in the positive electrode lead 16.

There are cases where the secondary battery 10 deforms to be compressed in a central axis O direction in a crush test or the like. The central axis O direction of the secondary battery 10 coincides with the winding axis direction α of the electrode group 14. In this case, when the upper insulating plate 26 has the lead hole 27 through which the positive electrode lead 16 penetrates as described below, depending on the shape of the lead hole 27, there is a possibility that the exposed portion of the positive electrode lead 16 from the insulating tape may come into contact with the electrode group 14 through the lead hole 27 and short-circuiting may occur. In the present embodiment, the shape of the lead hole 27 is regulated as described below in order to effectively prevent this short-circuiting.

In addition, inside the exterior can 20, a lower insulating plate (not shown) is disposed between the lower end of the electrode group 14 and the bottom portion of the exterior can 20. A through hole is formed in the central portion of the lower insulating plate. The negative electrode lead 40 (FIG. 3) joined to the negative electrode core body at one end is drawn out toward a lower side of the lower insulating plate through the through hole in the lower insulating plate or the outer circumferential side of the lower insulating plate and joined to the bottom portion of the exterior can 20 by welding.

Figure 5A:
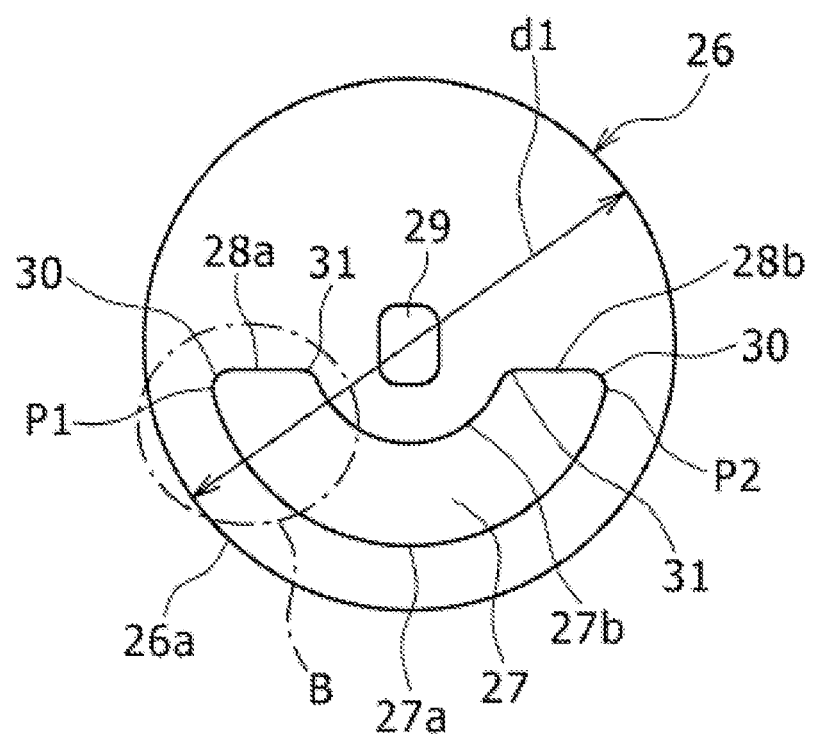
FIG. 5A is a plan view of an upper insulating plate shown in FIG. 1.
Figure 5B:
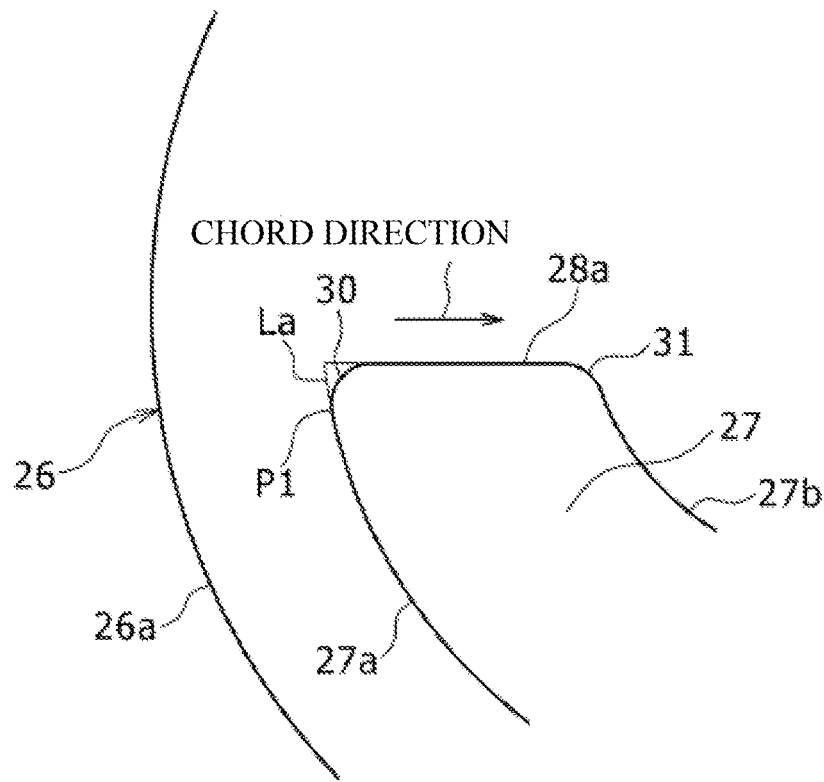
FIG. 5B is an enlarged view of a portion B in FIG. 5A.

The upper insulating plate 26 will be described in detail using FIG. 5A and FIG. 5B. FIG. 5A is a plan view of the upper insulating plate 26. FIG. 5B is an enlarged view of a portion B in FIG. 5A. The upper insulating plate 26 has a disc shape having a small thickness. The upper insulating plate 26 is formed of, for example, an insulating material such as a polyolefin-based resin. The polyolefin-based resin is preferable from the viewpoint of reduction in production costs, and, for example, a polypropylene resin can be used as the polyolefin-based resin.

The upper insulating plate 26 is used to prevent short-circuiting between the electrode group 14 and the positive electrode lead 16 drawn out from the electrode group 14 or the like. Therefore, the upper insulating plate 26 preferably covers almost the entire upper end of the electrode group 14. Therefore, an outer diameter d1 (FIG. 5A) of the upper insulating plate 26 coincides with an inner diameter d2 (FIG. 1) of the exterior can 20 before the use of the secondary battery 10 or is slightly smaller than the inner diameter d2 in consideration of the insertability into the exterior can 20 at the time of assembly. For example, the outer diameter d1 of the upper insulating plate 26 is preferably 98% or more and 100% or less of the inner diameter d2 of the exterior can 20 and more preferably 98% or more and 99.8% or less.

A central hole 29 is formed in the central portion of the upper insulating plate 26. The central hole 29 has a substantially rectangular shape with each corner portion rounded in an arc shape, but may have a circular shape, an oval shape or a different polygonal shape. The maximum width of the central hole 29 is preferably set to be smaller than a width W (FIG. 9) of the positive electrode lead 16 so as to prevent short-circuiting caused by the contact between the positive electrode lead 16 and the electrode group 14 through the central hole 29.

A columnar space portion (not shown) is formed along the winding axis direction α inside the innermost circumferential surface that is the central portion of the electrode group 14 including the winding axis. Preferably, the central hole 29 faces this columnar space, but does not face the electrode group 14 in a case of being viewed in the central axis O direction of the secondary battery 10. In this case, even in a case where the exposed portion of the positive electrode lead 16 from the insulating tape is present immediately above the central hole 29, the positive electrode lead 16 does not come into contact with the electrode group 14 through the central hole 29, and short-circuiting between the electrode group 14 and the positive electrode lead 16 can be effectively prevented.

In a half portion on one side (lower-side half portion in FIG. 5A) of the upper insulating plate 26, the lead hole 27 having an arc shape of substantially a semicircle is formed so as to avoid the central hole 29. The central hole 29 and the lead hole 27 are each preferably formed large from the viewpoint of improving exhaust properties in a case where gas is generated in the secondary battery 10.

As shown in FIG. 5A, the outer edge portion of the lead hole 27 is demarcated using an arc concentric with an outer circumferential circle 26a of the upper insulating plate 26 and a chord that connects both ends of the arc as reference. The outer edge portion of the lead hole 27 includes an outside curve portion 27a, an inside curve portion 27b and straight portions 28a and 28b. In a plan view, the outside curve portion 27a is disposed along the reference arc, and the straight portions 28a and 28b are disposed along the chord that connect both ends of the reference arc. The outside curve portion 27a may coincide with the reference arc. In this case, the straight portions 28a and 28b are directly connected to both ends of the outside curve portion 27a. The reference arc is preferably a minor arc that is smaller than a semicircle. The inside curve portion 27b is disposed so as to avoid the central hole 29. The inside curve portion 27b is also preferably disposed along another arc concentric with the outer circumferential circle 26a of the upper insulating plate 26. The inside curve portion 27b may not be provided depending on the positional relationship between the lead hole 27 and the central hole 29. In this case, the straight portions 28a and 28b configure one straight line.

In a case where an R portion 30 is interposed between the outside curve portion 27a and the straight portion 28a as shown in FIG. 5B, the reference arc can be specified by drawing an extension line La along the reference arc from a first end P1 of the outside curve portion 27a. In this case, the R portion 30, which serves as a connection portion between the outside curve portion 27a and the straight portion 28a, preferably has a shape in which the connection portion between the reference arc and the chord is chamfered. What has been described above is also true for an R portion 31 that is interposed between each of the straight portions 28a and 28b and the inside curve portion 27b.

Furthermore, in the upper insulating plate 26, the opening rate of the total opening rate that is the total area of the central hole 29 and the lead hole 27 with respect to the area (including the insides of the central hole 29 and the lead hole 27) of the upper insulating plate 26 in the outer circumferential circle 26a is not particularly limited, but is preferably 11% or more. When the opening rate is less than 11%, an exhaust passage in a case where gas is generated on the electrode group 14 side of the secondary battery 10 becomes small, and exhaust performance becomes insufficient. The upper limit of the opening rate can be appropriately determined depending on the strength of the upper insulating plate 26. For example, the upper limit can be set to 60% or less and is preferably set to 40% or less and more preferably set to 20% or less.

A thickness of the upper insulating plate 26 is, for example, 0.2 mm or more and 0.5 mm or less. When this thickness is less than 0.2 mm, the strength of the upper insulating plate 26 decreases, and there is a concern that the electrode group 14 may be shoved toward the sealing assembly 22 when an impact is applied to the secondary battery 10. When the thickness of the upper insulating plate 26 is more than 0.5 mm, the inner volume of the battery decreases, which significantly decreases the capacity of the battery.

Figure 6:
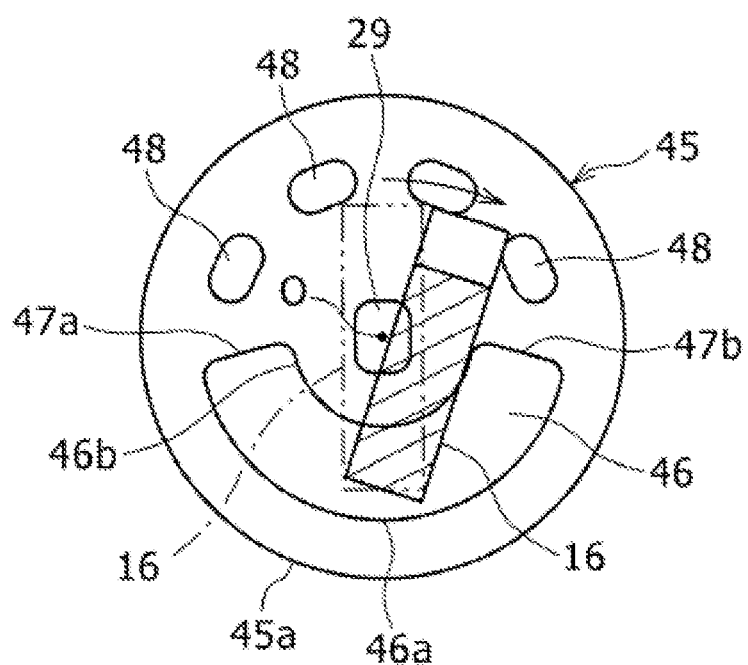
FIG. 6 is a view showing a positional relationship between a positive electrode lead and a lead hole in a case of viewing an upper insulating plate from above in a case where the positive electrode lead is drawn out from a central position of the lead hole in a circumferential direction in a cylindrical non-aqueous electrolyte secondary battery of comparative example.

According to the secondary battery 10, it is possible to effectively prevent short-circuiting between the electrode group 14 and the positive electrode lead 16 that arises from a variation of the folding position of the positive electrode lead 16 with respect to the upper insulating plate 26. In order to describe this effect, first, disadvantages of comparative examples will be described. FIG. 6 is a view showing the positional relationship between the positive electrode lead 16 and a lead hole 46 at the time of viewing an upper insulating plate 45 from above in a case where the positive electrode lead 16 is drawn out from the central position of the lead hole 46 in the circumferential direction in a secondary battery of a comparative example. FIG. 7 is a view corresponding to FIG. 6 in a case where the positive electrode lead 16 is drawn out from one end portion of the lead hole 46 in the circumferential direction in the secondary battery of the comparative example.

The upper insulating plate 45 of the comparative example shown in FIG. 6 has the same planar shape as the upper insulating plate described in Patent Literature 1. Specifically, the upper insulating plate 45 has the central hole 29 formed in the central portion, the lead hole 46 having an arc shape of substantially a semicircle formed in a half portion on one side (lower-side half portion in FIG. 6) and outer circumferential holes 48 formed at a plurality of positions along the circumferential direction in a half portion on the other side (upper-side half portion in FIG. 6). Regarding the outer edge portion of the lead hole 46, an outside curve portion 46a is also disposed along an arc concentric with an outer circumferential circle 45a of the upper insulating plate 45. However, unlike the present embodiment, straight portions 47a and 47b that are interposed between the outside curve portion 46a and an inside curve portion 46b are disposed not in a direction of a chord that connects both ends of a reference arc, but along the radial direction that connect both ends of the reference arc and the center of the arc.

At the time of assembling the secondary battery, the positive electrode lead 16 that has penetrated the lead hole 46 is preferably folded toward the central axis O of the secondary battery as shown by the positive electrode lead 16 indicated by a dash-two dotted line in FIG. 6. In each of FIG. 6 and FIG. 7, a hatched portion in the positive electrode lead 16 indicates a portion to which insulating tape is attached, and a plain portion indicates an exposed portion of a conductive portion from the insulating tape.

At the time of folding the positive electrode lead 16, there is a possibility that the positive electrode lead 16 may be folded toward a position deviating from the central axis O as shown by the positive electrode lead 16 indicated by a solid line in FIG. 6. Even in this case, the exposed portion of the positive electrode lead 16 on the opposite side to the drawn portion is unlikely to face the lead hole 46 as long as the positive electrode lead 16 is drawn out upward from the central position of the lead hole 46 in the circumferential direction as shown in FIG. 6.

Incidentally, at the time of assembling the secondary battery, depending on the relationship between the drawing position of the positive electrode lead 16 from the electrode group and the position of the upper insulating plate 45 in the circumferential direction, there is a possibility that the positive electrode lead 16 may be drawn out toward the upper side from one end portion of the lead hole 46 in the circumferential direction (left end portion in FIG. 7) as shown in FIG. 7. In this case, the exposed portion of the positive electrode lead 16 does not face the electrode group through the lead hole 46 as long as the positive electrode lead 16 is folded toward the central axis O of the secondary battery like the positive electrode lead 16 indicated by a dash-two dotted line in FIG. 7. In a case where the positive electrode lead 16 is folded in a direction toward the other end of the lead hole 46 in the circumferential direction (right end portion in FIG. 7) from the central axis O as shown by the positive electrode lead 16 indicated by a solid line in FIG. 7, the exposed portion of the positive electrode lead 16 is likely to face the other end portion of the lead hole 46 in the circumferential direction. Therefore, in a case where the secondary battery deforms to be compressed in the central axis O direction, there is a possibility that the exposed portion of the positive electrode lead 16 may come into contact with the electrode group through the lead hole 46 and thereby short-circuiting may occur. Therefore, at the time of producing secondary batteries, production failure having a concern of short-circuiting in the future is caused, which increases the production costs of batteries.

In order to prevent such disadvantages of the comparative example, it is also conceivable to shorten the length of the lead hole 46 in the circumferential direction as a whole. However, in such a case, the insertability of the positive electrode lead 16 into the lead hole 46 at the time of assembling secondary batteries is likely to deteriorate. According to the embodiment, such disadvantages can be prevented.

FIG. 8(a) and FIG. 8(b) are views showing different portions between the shape of the lead hole 27 in the upper insulating plate 26 of the embodiment and the shape of the lead hole 46 of the comparative example. In the comparative example shown in FIG. 8(a), the straight portions 47a and 47b are disposed along the radial directions that connects both ends of the reference arc and the center of the arc. However, in the embodiment shown in FIG. 8(b), the straight portions 28a and 28b are disposed along the chord that connects both ends of the reference arc. Due to these differences, in the embodiment, it is possible to decrease the ratio of the length of the inside curve portion 27b to the length of the outside curve portion 27a compared with that in the comparative example. This makes it difficult for the positive electrode lead drawn out from one end portion (for example, left end portion in FIG. 8(b)) of the lead hole 27 to face the other end portion (for example, right end portion in FIG. 8(b)) of the lead hole 27 while securing the insertability of the positive electrode lead 16 into the lead hole 27.

Figure 9:
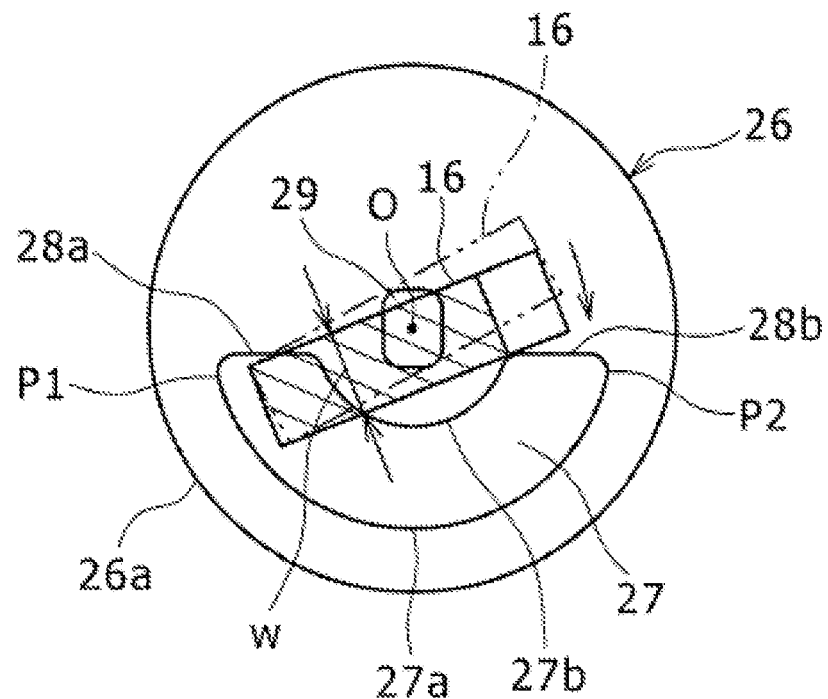
FIG. 9 is a view of the embodiment corresponding to FIG. 7.

FIG. 9 is a view of the embodiment corresponding to FIG. 7. As shown in FIG. 9, according to the upper insulating plate 26 of the embodiment, the individual straight portions 28a and 28b that connect the outside curve portion 27a and the inside curve portion 27b of the lead hole 27 are disposed along the chord that connects both ends of the reference arc of the outside curve portion 27a. Therefore, even in a case where the positive electrode lead 16 drawn out from one end portion (left end portion in FIG. 9) of the lead hole 27 in the circumferential direction is folded toward a position deviating from the central axis O of the secondary battery, like the positive electrode lead 16 indicated by a solid line in FIG. 9, it is possible to prevent the drawn portion of the positive electrode lead 16 from facing the electrode group 14 through the lead hole 27. This makes it possible to effectively prevent short-circuiting between the electrode group 14 and the positive electrode lead 16 that arises from a variation of the folding position of the positive electrode lead 16 with respect to the upper insulating plate 26.

Furthermore, in the case of the present example, since the upper insulating plate 26 has only the lead hole 27 and the central hole 29 as through holes, it is possible to more effectively prevent short-circuiting between the electrode group 14 and the positive electrode lead 16 through the through holes.

Furthermore, as shown in FIGS. 2 to 4, in the negative electrode 12, the non-facing portion 12a that does not face the positive electrode 11 through the separator 13 is wound 1.25 windings or more from the winding-direction inner end of the electrode group 14. In addition, in the non-facing portion 12a, the negative electrode mixture layer-formed portion 12c on which negative electrode mixture layers 12f are formed is wound 0.75 windings or more. Any of both surfaces of the negative electrode mixture layer-formed portion 12c does not face the positive electrode 11. Therefore, the negative electrode mixture layer-formed portion 12c does not react with the positive electrode 11 in a case of ignition of the secondary battery 10, and thus a portion of the negative electrode mixture layer-formed portion 12c close to the winding-direction inner end, including the negative electrode core body portion, remains in a tubular shape in the winding core of the electrode group 14. In addition, the negative electrode mixture layer-formed portion 12c has high strength compared with a portion where only the negative electrode core body is exposed on both surfaces. Therefore, the portion that remains in a tubular shape serves as an exhaust path and is capable of guiding high-temperature and high-pressure gas that is generated in the battery in a case of ignition in the vertical direction to efficiently exhaust the gas. Therefore, it is possible to suppress the secondary battery 10 being ruptured due to an excessive increase in the internal pressure of the secondary battery 10. In addition, since there is no need to provide a tubular metal member in a winding core of the secondary battery 10 in order to efficiently exhaust the gas as described above, it is possible to suppress an increase in costs. This makes it possible to realize, at low costs, a structure capable of securing an exhaust path for the winding core of the electrode group 14 in a case of ignition of the secondary battery 10.

EXAMPLES

The inventor of the present disclosure produced secondary batteries 10 of Experiment Examples 1 to 4 and performed high-temperature overheating tests as described below.

Experiment Example 1

[Production of Positive Electrode]

As a positive electrode active material, aluminum-containing lithium nickel cobalt oxide represented by $LiNi_{0.88}Co_{0.09}Al_{0.03}O_2$ was used. After that, 100 parts by weight of $LiNi_{0.88}Co_{0.09}Al_{0.03}O_2$, 1.0 part by weight of acetylene black and 0.9 parts by weight of polyvinylidene fluoride (PVDF) (binding agent) were mixed in an appropriate amount of N-methyl-2-pyrrolidone (NMP) as a solvent, thereby obtaining a positive electrode mixture slurry. This paste-form positive electrode mixture slurry was uniformly applied to both surfaces of a long positive electrode core body made of a 15 μm-thick aluminum foil. Next, NMP was removed at a temperature of 100° C. to 150° C. in a heated dryer, rolling was performed with a roll press machine to form positive electrode mixture layers, and furthermore, a rolled positive electrode was brought into contact with a roller heated to 200° C. for five seconds, thereby performing a thermal treatment. In addition, the long positive electrode core body on which the positive electrode mixture layers had been formed was cut into an electrode size of a predetermined size to produce a positive electrode 11, and then an aluminum positive electrode lead 16 was attached to the positive electrode core body. The produced positive electrode 11 was 0.144 mm in thickness, 62.6 mm in width, and 861 mm in length.

[Production of Negative Electrode]

As a negative electrode active material, a mixture of graphite powder and silicon oxide at a ratio of 95 parts by weight and 5 parts by weight was used. After that, this mixture, 1 part by weight of carboxymethyl cellulose (CMC) as a viscosity improver and 1 part by weight of a dispersion of styrene-butadiene rubber as a binding agent were dispersed in water, thereby adjusting a negative electrode mixture slurry. This negative electrode mixture slurry was applied to both surfaces of a negative electrode core body made of an 8 μm-thick copper foil to form negative electrode-coated portions. At this time, the negative electrode-coated portions were formed such that the outermost circumferential surface of an electrode group became the negative electrode core body. Next, the coated films were dried in a heated dryer and then compressed with a compression roller such that the thickness of a negative electrode reached 160 μm, and the thicknesses of negative electrode mixture layers were adjusted. In addition, the long negative electrode core body on which the negative electrode mixture layers had been formed was cut into an electrode size of a predetermined size to produce a negative electrode 12 having the negative electrode mixture layers formed on both surfaces, and then a nickel-copper-nickel negative electrode lead 40 was attached to the negative electrode core body. The produced negative electrode 12 was 64.2 mm in width and 959 mm in length.

[Production of Electrode Group for Battery]

The positive electrode 11 and the negative electrode 12 were wound in a cylindrical shape with a polyethylene separator 13 interposed therebetween to configure an electrode group 14.

[Preparation of Non-Aqueous Electrolytic Solution]

Ethylene carbonate (EC) and dimethyl carbonate (DMC) were mixed in a volume ratio of 1:3, 5 parts by weight of vinylene carbonate (VC) was added to 100 parts by weight of the solvent mixture, and $LiPF_6$ was dissolved in the solvent mixture such that the concentration reached 1.5 mol/L, thereby preparing a non-aqueous electrolytic solution.

[Production of Upper Insulating Plate]

As an upper insulating plate 26, a 0.3 mm-thick circular plate material made of polypropylene resin was used, and a lead hole 27 through which the positive electrode lead 16 was to pass and a central hole 29 were formed as shown in FIG. 5A. The central hole 29 was 2.2 mm in length and 3 mm in width. In addition, the lead hole 27 through which the positive electrode lead 16 was to pass was formed such that the total opening rate of the central hole 29 and the lead hole 27 reached 18.3%.

[Production of Secondary Battery]

The upper insulating plate 26 and a lower insulating plate were disposed on and under the electrode group 14, respectively, and the electrode group 14 was stored in an exterior can 20. The positive electrode lead 16 was drawn out from the electrode group 14 through the lead hole 27 in the upper insulating plate 26. The negative electrode lead 40 was welded to the exterior can 20 in a battery case 18, and the positive electrode lead 16 was welded to a sealing assembly 22 having an internal pressure actuated safety valve. After that, the non-aqueous electrolytic solution was poured into the inside of the battery case 18 by a decompression method. In the end, the sealing assembly 22 was swaged into an open end portion in the upper portion of the exterior can 20 through a gasket 24, thereby producing a secondary battery 10. The volume of the secondary battery 10 was 4600 mAh. In addition, in the negative electrode 12, a non-facing portion 12a that did not face the positive electrode 11 through the separator 13 was wound 1.75 windings. In addition, in the non-facing portion 12a, a negative electrode mixture layer-formed portion 12c on which negative electrode mixture layers 12f were formed was wound 0.75 windings, and a negative electrode core body-exposed portion 12d was wound one winding.

Experiment Example 2

Figures 11, 12:
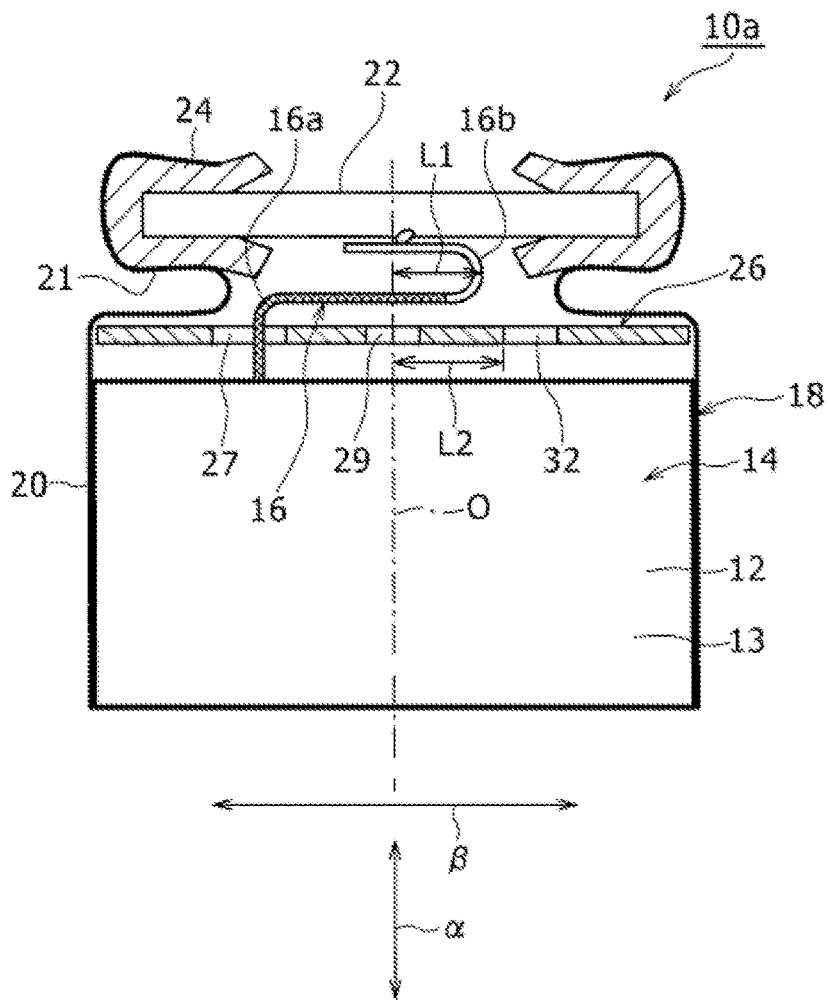
FIG. 11 is a view in which shapes of upper insulating plates, opening rates with respect to areas of the upper insulating plates within outer circumferential circles and rupture rates of battery cases in cylindrical non-aqueous electrolyte secondary batteries of Experiment Examples 1 to 4 are compared.
FIG. 12 is a view of a different example of the embodiment corresponding to FIG. 1.

A secondary battery according to Experiment Example 2 was produced in the same manner as in Experiment Example 1 except that the lead hole 27 through which the positive electrode lead 16 was to pass was formed such that the total opening rate of the central hole 29 and the lead hole 27 reached 15.4%. The shape of the upper insulating plate 26 in Experiment Example 2 will be shown in the "Experiment Example 2" column in FIG. 11 shown below.

Experiment Example 3

Figure 10:
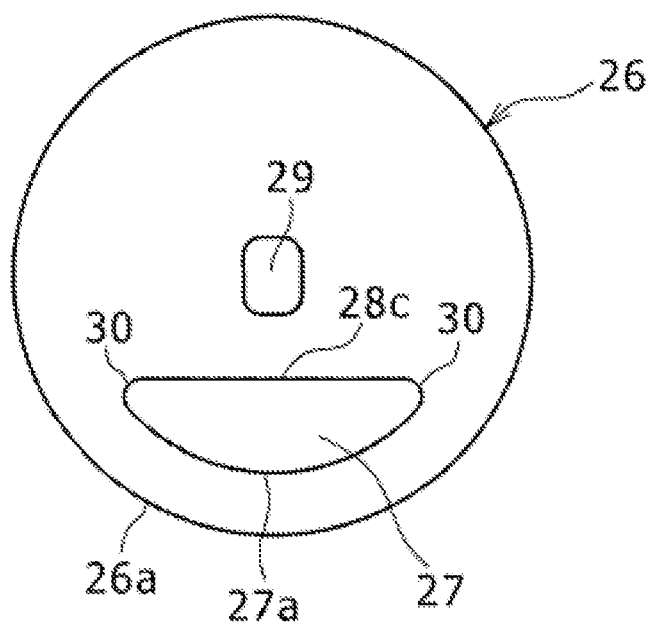
FIG. 10 is a view corresponding to FIG. 5 of an upper insulating plate according to a cylindrical non-aqueous electrolyte secondary battery of Experiment Example 3.

FIG. 10 is a view corresponding to FIG. 5 of an upper insulating plate 26 according to a secondary battery of Experiment Example 3. The secondary battery according to Experiment Example 3 was produced in the same manner as in Experiment Example 1 except that, as shown in FIG. 10, the lead hole 27 through which the positive electrode lead 16 (FIG. 1) was to pass was formed in the upper insulating plate 26 such that the total opening rate of the central hole 29 and the lead hole 27 reached 11.7%. The shape of the upper insulating plate 26 in Experiment Example 3 will also be shown in the "Experiment Example 3" column in FIG. 11 shown below. As shown in FIG. 10, since the lead hole 27 became significantly smaller than the cases of Experiment Examples 1 and 2, an inside curve portion for avoiding the central hole 29 was not formed in the lead hole 27. Specifically, the outer edge portion of the lead hole 27 included, in a plan view, an outside curve portion 27a disposed along an arc concentric with an outer circumferential circle 26a of the upper insulating plate 26 and a straight portion 28c connected to both ends of the outside curve portion 27a through R portions 30. The straight portion 28c was disposed along a chord that connected both ends of a reference arc.

Experiment Example 4

A secondary battery according to Experiment Example 4 was produced in the same manner as in Experiment Example 1 except that the lead hole 27 through which the positive electrode lead 16 was to pass was formed such that the total opening rate of the central hole 29 and the lead hole 27 reached 5.6%. The shape of the upper insulating plate 26 in Experiment Example 4 will be shown in the "Experiment Example 4" column in FIG. 11 shown below. In the lead hole 27 of Experiment Example 4 as well, similar to the lead hole 27 of Experiment Example 3, no inside curve portion was formed.

[Overheating Test]

Ten secondary batteries of each of Experiment Examples 1 to 4 were charged with a constant current of 1380 mA until the voltage reached 4.2 V and then charged with a constant voltage of 4.2 V until the current reached 92 mA. An overheating test for evaluating exhaust properties was performed using the secondary batteries charged as described above. The overheating test is a test that simulates the fire-catching environment of a battery module. In the overheating test, the ten secondary batteries of each of Experiment Examples 1 to 4 were overheated with radiant heat in a heating furnace at 300° C. to forcibly cause thermal runaway, and the rupture rate of the battery cases was verified.

[Test Results]

FIG. 11 is a view in which the shapes of the upper insulating plates 26, the opening rates with respect to the areas of the outer circumferential circles of the upper insulating plates 26 and the rupture rates of the battery cases in the secondary batteries of Experiment Examples 1 to 4 are compared. As shown in FIG. 11, according to Experiment Examples 1 to 3 in which the total opening rate of the lead hole 27 and the central hole 29 with respect to the area of the outer circumferential circle of the upper insulating plate 26 was 11% or more, it was possible to achieve a rupture rate of the battery cases in the overheating test being zero. On the other hand, in Experiment Example 4 in which this opening rate was less than 11%, the battery cases ruptured in the overheating test. Therefore, it was possible to confirm that, when the opening rate is set to 11% or more, it is possible to rapidly exhaust gas that is generated in batteries and to realize secondary batteries having higher safety.

Different Example of Embodiment

Figure 13:
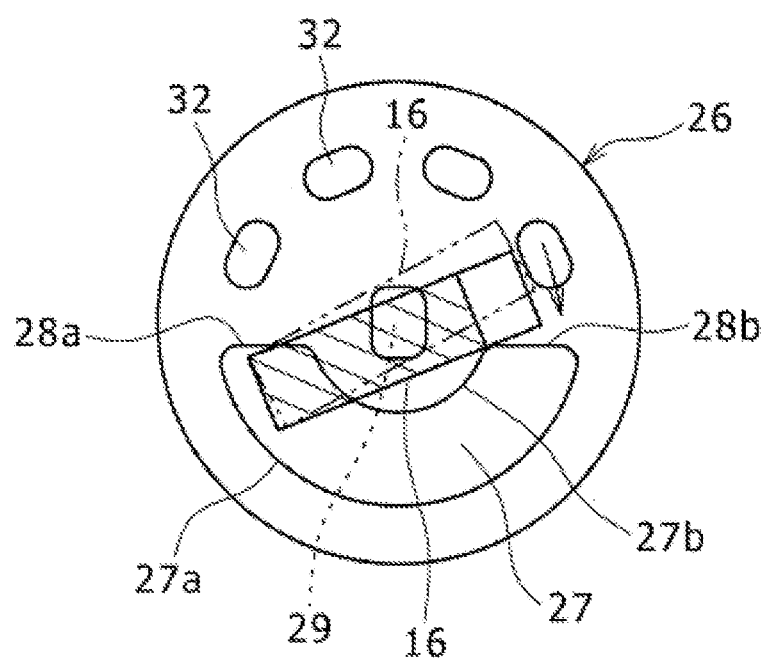
FIG. 13 is a view of the different example of the embodiment corresponding to FIG. 7.

FIG. 12 is a view of a different example of the embodiment corresponding to FIG. 1. FIG. 13 is a view of the different example of the embodiment corresponding to FIG. 7. In a secondary battery 10a of the present example, outer circumferential holes 32 are formed side by side in the circumferential direction as a plurality (four in FIG. 13) of through holes in a half portion on the opposite side to the lead hole 27 in the upper insulating plate 26. Furthermore, in a case where the distance from the central axis O of the secondary battery 10a to the second curve portion 16b of the positive electrode lead 16 (the distance from the central axis O to the portion farthest from the central axis O in the second curve portion 16b) is indicated by L1 and the distance from the central axis O of the secondary battery 10 to the outer circumferential hole 32 (the distance from the central axis O to the portion closest to the central axis O in the outer circumferential hole 32) is indicated by L2, L1 and L2 are regulated so as to satisfy L2>L1. In such a case, even in a case where, in addition to the lead hole 27 and the central hole 29 in the upper insulating plate 26, the outer circumferential holes 32 are formed as additional through holes, it is possible to prevent short-circuiting caused by the contact between the exposed portion of the positive electrode lead 16 and the electrode group 14 through the outer circumferential holes 32. In addition, since a number of through holes are formed in the upper insulating plate 26, it is possible to enhance the exhaust properties of internal gases. As described above, in the configuration of the present disclosure, it is also possible to form through holes other than the lead hole 27 and the central hole 29 in the upper insulating plate 26. In the present example, other configurations and actions are the same as in the configurations of FIGS. 1 to 5 and FIG. 9.

It should be noted that, in the configuration of FIG. 12 and FIG. 13, in a case where different through holes other than the lead hole 27 and the central hole 29 are formed in the upper insulating plate 26, when the maximum width of the different through hole is set to be smaller than the width W (FIG. 9) of the positive electrode lead 16, it is also possible to set the distance L2 from the central axis O of the secondary battery 10 to the different through hole to less than the distance L1 from the central axis O of the secondary battery 10 to the second curve portion 16b of the positive electrode lead 16.

REFERENCE SIGNS LIST 10, 10a cylindrical non-aqueous electrolyte secondary battery (secondary battery), 11 positive electrode, 12 negative electrode, 12a non-facing portion, 12b facing portion, 12c negative electrode mixture layer-formed portion, 12d negative electrode core body-exposed portion, 12f negative electrode mixture layer, 13 separator, 14 electrode group, 16 positive electrode lead, 16a first curve portion, 16b second curve portion, 18 battery case, 20 exterior can, 21 projecting portion, 22 sealing assembly, 24 gasket, 26 upper insulating plate, 26a outer circumferential circle, 27 lead hole, 27a outside curve portion, 27b inside curve portion, 28a, 28b, 28c straight portion, 29 central hole, 30, 31 R portion, 32 outer circumferential circle, 40 negative electrode lead, 45 upper insulating plate, 46 lead hole, 48 outer circumferential hole.

The invention claimed is:
1. A cylindrical non-aqueous electrolyte secondary battery, comprising:
an exterior can;
a sealing assembly that seals one end of the exterior can;
an electrode group disposed inside the exterior can; and
an insulating plate disposed between the sealing assembly and the electrode group,
wherein the electrode group includes a positive electrode and a negative electrode wound in a spiral shape with a separator interposed therebetween, the insulating plate has a disc shape having a lead hole through which a positive electrode lead that is drawn out from the electrode group penetrates and a central hole that penetrates a central portion, an outer edge portion of the lead hole includes, in a plan view, a curve portion disposed along an arc concentric with an outer circumferential circle of the insulating plate and a straight portion disposed along a chord that connects both ends of the arc, wherein the arc is a minor arc that is smaller than a semicircle, and the straight portion is connected to an end of the curve portion directly or via only a connection portion chamfered in an arc shape in a plan view.

2. The cylindrical non-aqueous electrolyte secondary battery according to claim 1, wherein connection portions between the curve portion and the straight portion each have a shape in which the connection portion between the arc and the chord is chamfered in a plan view.

3. The cylindrical non-aqueous electrolyte secondary battery according to claim 1, wherein the insulating plate has only the lead hole and the central hole as through holes.

4. The cylindrical non-aqueous electrolyte secondary battery according to claim 3, wherein the sealing assembly is configured to release gas that is generated inside when an internal pressure reaches a predetermined pressure, and in a case where the central hole is viewed in a winding axis direction of the electrode group, the central hole does not face the electrode group, and a total opening rate of the lead hole and the central hole is 11% or more with respect to an area of the insulating plate within the outer circumferential circle.

5. The cylindrical non-aqueous electrolyte secondary battery according to claim 1, wherein a material of the insulating plate is polyolefin-based resin.

6. The cylindrical non-aqueous electrolyte secondary battery according to claim 1, wherein a thickness of the insulating plate is 0.2 mm or more and 0.5 mm or less.

7. The cylindrical non-aqueous electrolyte secondary battery according to claim 1, wherein the negative electrode includes a non-facing portion wound 1.25 windings or more from an inner end of the electrode group in a winding direction in a state of not facing the positive electrode through the separator, the non-facing portion has a negative electrode mixture layer-formed portion in which a negative electrode mixture layer is formed continuously from a winding-direction outer end toward a winding-direction inside on at least one surface, and the negative electrode mixture layer-formed portion is wound 0.75 windings or more.

8. A cylindrical non-aqueous electrolyte secondary battery, comprising: an exterior can;

a sealing assembly that seals one end of the exterior can;

an electrode group disposed inside the exterior can; and an insulating plate disposed between the sealing assembly and the electrode group, wherein the electrode group includes a positive electrode and a negative electrode wound in a spiral shape with a separator interposed therebetween, the insulating plate has a disc shape having a lead hole through which a positive electrode lead that is drawn out from the electrode group penetrates and a central hole that penetrates a central portion, an outer edge portion of the lead hole includes, in a plan view, a curve portion and a straight portion, the curve portion is disposed along an arc concentric with an outer circumferential circle of the insulating plate, and the straight portion is disposed along a chord that connects both ends of the arc, wherein the arc is a minor arc that is smaller than a semicircle.

* * * * *